United States Patent
Okamoto et al.

(10) Patent No.: US 10,158,136 B2
(45) Date of Patent: Dec. 18, 2018

(54) FUEL CELL SYSTEM AND FUEL CELL CONTROL METHOD

(71) Applicant: TOYOTA JIDOSHA KABUSHIKI KAISHA, Toyota-shi, Aichi-ken (JP)

(72) Inventors: Yohei Okamoto, Toyota (JP); Yutaka Tano, Toyota (JP); Mitsuhiro Nada, Toyota (JP); Tomohiko Kaneko, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 449 days.

(21) Appl. No.: 14/937,675

(22) Filed: Nov. 10, 2015

(65) Prior Publication Data

US 2016/0141689 A1 May 19, 2016

(30) Foreign Application Priority Data

Nov. 13, 2014 (JP) ................................. 2014-230379

(51) Int. Cl.
| | | |
|---|---|---|
| H01M 8/04 | (2016.01) | |
| H01M 8/04858 | (2016.01) | |
| H01M 8/04537 | (2016.01) | |
| H01M 8/04828 | (2016.01) | |
| H01M 8/04664 | (2016.01) | |
| H01M 8/1018 | (2016.01) | |

(52) U.S. Cl.
CPC ..... *H01M 8/04873* (2013.01); *H01M 8/0494* (2013.01); *H01M 8/04552* (2013.01); *H01M 8/04671* (2013.01); *H01M 2008/1095* (2013.01)

(58) Field of Classification Search
CPC ........ H01M 8/04873; H01M 8/04552; H01M 8/0494; H01M 8/04671; H01M 2008/1095
See application file for complete search history.

(56) References Cited

U.S. PATENT DOCUMENTS

| | | | |
|---|---|---|---|
| 8,221,924 B2 * | 7/2012 | Kajiwara | ........... H01M 8/04119 429/428 |
| 2009/0226770 A1 | 9/2009 | Manabe et al. | |
| 2009/0286109 A1 | 11/2009 | Araki | |
| 2010/0013490 A1 | 1/2010 | Manabe | |
| 2014/0176142 A1 | 6/2014 | Park et al. | |
| 2014/0295302 A1 | 10/2014 | Ishikawa et al. | |
| 2015/0233975 A1 | 8/2015 | Itaya | |

FOREIGN PATENT DOCUMENTS

| | | |
|---|---|---|
| JP | 2002-117889 A | 4/2002 |
| JP | 2003-197230 A | 7/2003 |
| JP | 2004-335343 A | 11/2004 |
| JP | 2007-018741 A | 1/2007 |

(Continued)

*Primary Examiner* — Raymond Alejandro
(74) *Attorney, Agent, or Firm* — Finnegan, Henderson, Farabow, Garrett & Dunner, LLP (57) ABSTRACT

A fuel cell system comprising: a power generation controller that controls a value subject to control, which is a value exhibiting a power generating state by a fuel cell and is a value that is affected by alternating current applied to the fuel cell, to approach a target value; a dead zone setter that sets a dead zone with the target value as a reference; and, a stopper that stops the control by the power generation controller when the value subject to control is contained in the dead zone.

20 Claims, 6 Drawing Sheets

(56) References Cited

FOREIGN PATENT DOCUMENTS

| | | |
|---|---|---|
| JP | 2007-042363 A | 2/2007 |
| JP | 2007-48628 | 2/2007 |
| JP | 2007-53013 | 3/2007 |
| JP | 2008-098134 A | 4/2008 |
| JP | 2011-023198 A | 2/2011 |
| JP | 2011-233439 A | 11/2011 |
| JP | 5393934 B1 | 1/2014 |
| JP | 2014-203562 A | 10/2014 |
| KR | 10-1418180 | 7/2014 |
| WO | WO 2011/148265 A1 | 12/2011 |

\* cited by examiner

FUEL CELL SYSTEM AND FUEL CELL CONTROL METHOD

CROSS REFERENCE OF RELATED APPLICATIONS

This application claims priority rights based on the Japanese patent application of Application No. 2014-230379 applied for on Nov. 13, 2014, and all the disclosures thereof are incorporated herein by reference.

BACKGROUND

Field

The present invention relates to a fuel cell.

Related Art

To detect drying of a fuel cell, a method of applying alternating current to the fuel cell is known. By applying an alternating current in this way, the measured value of the cell voltage is a value for which the voltage of the alternating current is superimposed on the power generation voltage (JP2007-053013).

SUMMARY

Normally, cell voltage is controlled to control power generation by a fuel cell. However, in the case of the prior art noted above, the voltage of the alternating current is superimposed on the measured value of the cell voltage as noted above, so control of the cell voltage is sometimes unstable due to the effect of the alternating current. This kind of problem is not limited to controlling cell voltage, but is also common to cases of controlling any values exhibiting a power generating state by a fuel cell and are values affected by alternating current (hereafter called "value subject to control"). The present invention takes into consideration the issues noted above, and an object is to stabilize control of the value subject to control even when alternating current is applied to the fuel cell.

The present invention was created to address the problem noted above, and may be realized as aspects noted hereafter.

With one aspect, a fuel cell system is provided. This fuel cell system is equipped with a power generation controller that controls a value subject to control, which is a value exhibiting a power generating state by a fuel cell and is a value that is affected by alternating current applied to the fuel cell, to approach a target value, a dead zone setter that sets a dead zone with the target value as a reference, and a stopper that stops the control by the power generation controller when the value subject to control is contained in the dead zone. With this mode, even when alternating current is applied to the fuel cell, it is easier to stabilize the control of the value subject to control. This is because since the dead zone is set, even if the value subject to control is affected by the alternating current, it may be to inhibit the control of the power generation controller from following that effect.

With the aspect noted above, the power generation controller may acquire a value for which a smoothing process was done in time series on a physical quantity indicating the power generating state as the value subject to control. With this mode, the control is more stable.

With the aspects noted above, a selector may select as processing conditions used for the smoothing process steady state conditions when the power generating state is a steady state, and selects transient state conditions when the power generating state is a transient state. With this mode, it may be to select the smoothing process conditions according to whether the power generating state is the steady state or the transient state.

With the aspects noted above, the dead zone setter may set as a section width of the dead zone a range having a width of the amplitude or greater of the value obtained by executing the smoothing process on the alternating current component using the steady state conditions. With this mode, when the power generating state is the steady state, it is easy for the power generation controller to stop, so control of the value subject to control stabilizes.

With the aspects noted above, the transient state conditions may be conditions for which the value with the time closer to the present is reflected by the value subject to control more than with the steady state conditions. With this mode, when the power generating state is the transient state, the responsiveness of the control of the value subject to control is good.

With the aspects noted above, the dead zone setter may set as a section width of the dead zone a range having a width smaller than the amplitude of a value obtained by executing the smoothing process on the alternating current component using the transient state conditions. With this mode, the dead zone is set to a range having a small width as noted above, so the responsiveness of the control of the value subject to control is good.

With the aspects noted above, the selector may determine whether the power generating state is the transient state or the steady state based on at least one of current value fluctuation or voltage value fluctuation. With this mode, it may be to easily determine whether the power generating state is the transient state or the steady state.

With the aspects noted above, a circuit may execute applying of the alternating current and measurement of the voltage for which the alternating current was superimposed on the power generation voltage of the fuel cell, and for the power generation controller to acquire the physical quantity based on the voltage measured by the circuit. With this mode, it may be to give the circuit noted above a plurality of functions.

With the aspects noted above, the circuit may be a converter that transforms the power generation voltage. With this mode, it may be to give the converter a plurality of functions.

With the aspects noted above, the physical quantity may be electrical power. With this mode, it may be to use the aspects noted above for control of the power value.

With the aspects noted above, when the difference between the upper limit value of the dead zone and the target value is smaller than the difference between the target value and the upper limit value of the target value, the dead zone setter may set the upper limit value of the dead zone to a value greater than the upper limit value of the target value. With this mode, even when the value subject to control exceeds the upper limit value of the target value, if it is within the dead zone range, it may be to stop the power generation controller.

The aspects may be realized in various modes other than those noted above. For example, it may also be realized in modes such as a fuel cell control method, a computer program for realizing this method, a non-temporary recording medium for storing that computer program, a power generation control device for executing the computer program or the like.

DESCRIPTION OF THE EMBODIMENTS

Figure 1:
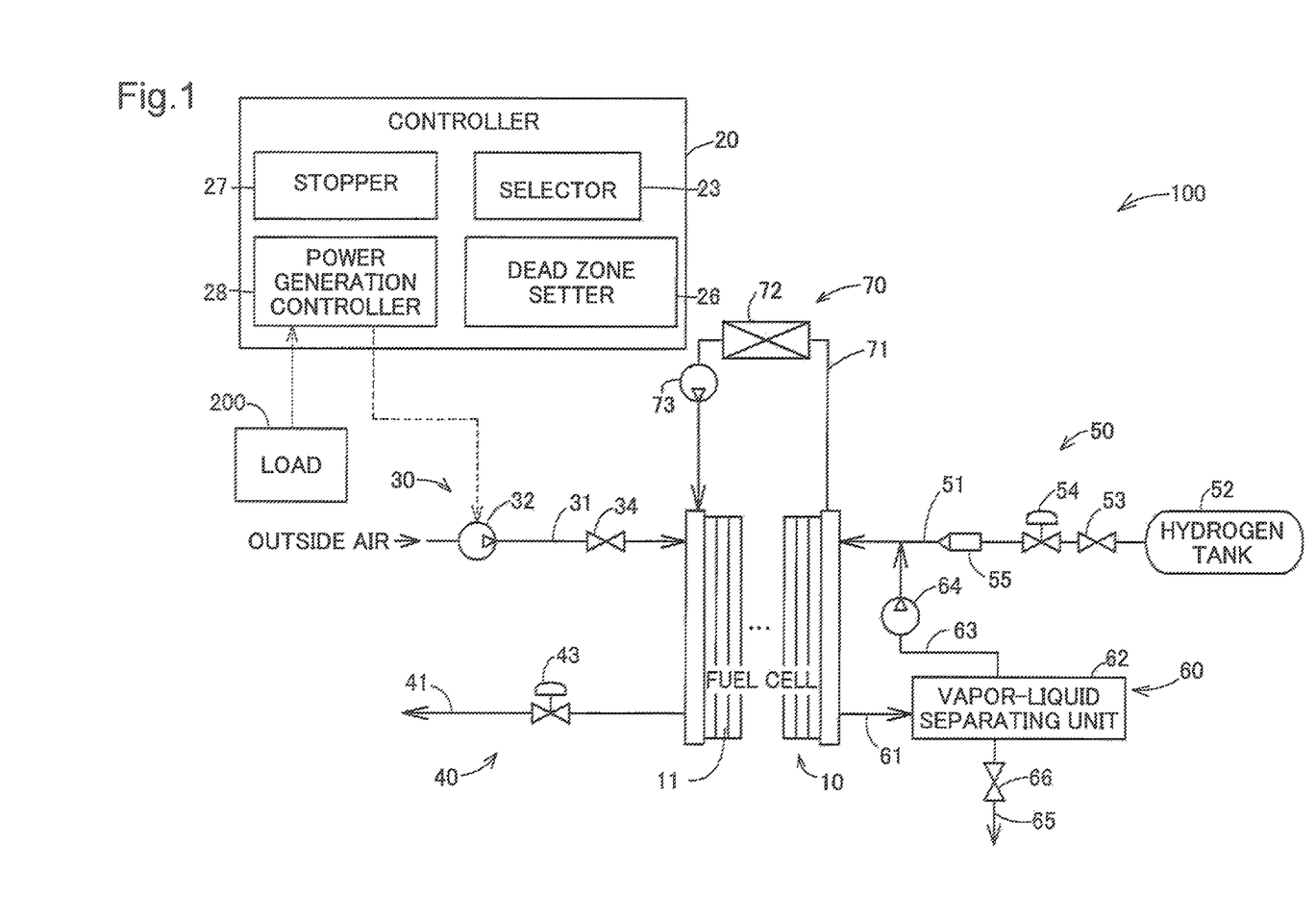
FIG. 1 is a schematic diagram showing the configuration of a fuel cell system.

FIG. 1 is a schematic diagram showing the configuration of a fuel cell system 100. The fuel cell system 100 is equipped with a fuel cell 10, a controller 20, a cathode gas supply unit 30, a cathode gas exhaust unit 40, an anode gas supply unit 50, an anode gas circulation exhaust unit 60, and a refrigerant supply unit 70.

The fuel cell 10 is a solid polymer type fuel cell that receives a supply of hydrogen (anode gas) and air (cathode gas) as reaction gases and generates power. The fuel cell 10 has a stack structure for which a plurality (e.g. 400) of cells 11 are laminated. Each cell 11 has a membrane electrode assembly that is a power generating body for which electrodes are arranged at both surfaces of an electrolyte membrane, and two separators that grip the membrane electrode assembly.

The electrolyte membrane is constituted by a solid polymer thin film with good proton conductivity in a wet state. The electrodes are constituted using carbon. On the surface of the electrolyte membrane side of the electrode, a platinum catalyst for promoting the power generating reaction is supported. A manifold (not illustrated) for the reaction gas or refrigerant is provided on each cell 11. The reaction gas of the manifold is supplied to the power generating region of each cell 11 via a gas flow path provided in each cell 11.

The controller 20 is equipped with a selector 23, a dead zone setter 26, a stopper 27, and a power generation controller 28. The controller 20 receives a power generation request from the load 200, and controls each constitutional unit of the fuel cell system 100 described hereafter according to that request to realize power generation by the fuel cell 10.

The cathode gas supply unit 30 is equipped with cathode gas piping 31, an air compressor 32, and an shutoff valve 34. The cathode gas piping 31 is piping connected to the cathode side of the fuel cell 10. The air compressor 32 is connected to the fuel cell 10 via the cathode gas piping 31, and supplies air for which outside air is taken in and compressed to the fuel cell 10 as the cathode gas. The power generation controller 28 of the controller 20, by driving the air compressor 32, associates the supply volume of air to the fuel cell 10 with the power supply to the load 200 and performs control.

The shutoff valve 34 is provided between the air compressor 32 and the fuel cell 10, and opens and closes according to the flow of air supplied with the cathode gas piping 31. In specific terms, the shutoff valve 34 is normally in a closed state, and opens when air having a designated pressure is supplied from the air compressor 32 to the cathode gas piping 31.

The cathode gas exhaust unit 40 is equipped with cathode exhaust gas piping 41 and a pressure regulating valve 43. The cathode exhaust gas piping 41 is piping connected to the cathode side of the fuel cell 10, and exhausts cathode exhaust gas to outside the fuel cell system 100. The pressure regulating valve 43 regulates the pressure of the cathode exhaust gas (back pressure of the fuel cell 10) with the cathode exhaust gas piping 41.

The anode gas supply unit 50 is equipped with anode gas piping 51, a hydrogen tank 52, an shutoff valve 53, a regulator 54, and an injector 55. The hydrogen tank 52 is connected to the anode of the fuel cell 10 via the anode gas piping 51, and supplies hydrogen filled inside the tank to the fuel cell 10.

The shutoff valve 53, the regulator 54, the injector 55, and the anode gas piping 51 are provided from the upstream side in this order (in other words, the side near the hydrogen tank 52). The open/closing valve 53 is opened and closed by commands from the controller 20, and controls the inflow of hydrogen from the hydrogen tank 52 to the upstream side of the injector 55. The regulator 54 is a pressure reducing valve for regulating the pressure of hydrogen at the upstream side of the injector 55.

The injector 55 is an electromagnetic drive type shutoff valve by which the valve body is electromagnetically driven according to the drive cycle and open valve time set by the controller 20. The controller 20 controls the volume of hydrogen supplied to the fuel cell 10 by controlling the drive cycle and the open valve time of the injector 55.

The anode gas circulation exhaust unit 60 is equipped with anode exhaust gas piping 61, a vapor liquid separator unit 62, anode gas circulation piping 63, a hydrogen circulation pump 64, anode drainage piping 65, and a drainage valve 66. The anode exhaust gas piping 61 is piping that connects the anode outlet of the fuel cell 10 and the vapor-liquid separator unit 62, and guides anode exhaust gas that contains unreacted gas (hydrogen, nitrogen or the like) that was not used in the power generating reaction.

The vapor-liquid separator unit 62 is connected to the anode gas circulation piping 63 and the anode drainage piping 65. The vapor-liquid separator unit 62 separates the vapor component and moisture contained in the anode exhaust gas, and guides the vapor component to the anode gas circulation piping 63, and guides the moisture to the anode drainage piping 65.

The anode gas circulation piping 63 is connected downstream from the injector 55 of the anode gas piping 51. The hydrogen circulation pump 64 is provided on the anode gas circulation piping 63, and hydrogen contained in the vapor component separated by the vapor-liquid separator unit 62 is sent by the hydrogen circulation pump 64 to the anode gas piping 51. In this way, with this fuel cell system 100, hydrogen contained in the anode exhaust gas is circulated, and by being supplied again to the fuel cell 10, the hydrogen usage efficiency is improved.

The anode drainage piping 65 is piping for exhausting moisture separated by the vapor-liquid separator unit 62 to outside the fuel cell system 100. The drainage valve 66 is provided on the anode drainage piping 65, and opens and closes according to commands from the controller 20. The controller 20 normally closes the drainage valve 66 during operation of the fuel cell system 100, and opens the drainage valve 66 at a preset designated drainage timing or an exhaust timing of inert gas in the anode exhaust gas.

The refrigerant supply unit 70 is equipped with refrigerant piping 71, a radiator 72, and a refrigerant circulation pump 73. The refrigerant piping 71 is piping that connects the inlet manifold and the outlet manifold for refrigerant provided on the fuel cell 10, and circulates refrigerant for cooling the fuel cell 10. The radiator 72 is provided on the refrigerant piping 71 and cools the refrigerant by doing heat exchange between the refrigerant flowing in the refrigerant piping 71 and the outside air.

The refrigerant circulation pump 73 is provided further to the downstream side (fuel cell 10 refrigerant inlet side) than the radiator 72 on the refrigerant piping 71, and sends refrigerant cooled at the radiator 72 to the fuel cell 10.

Figure 2:
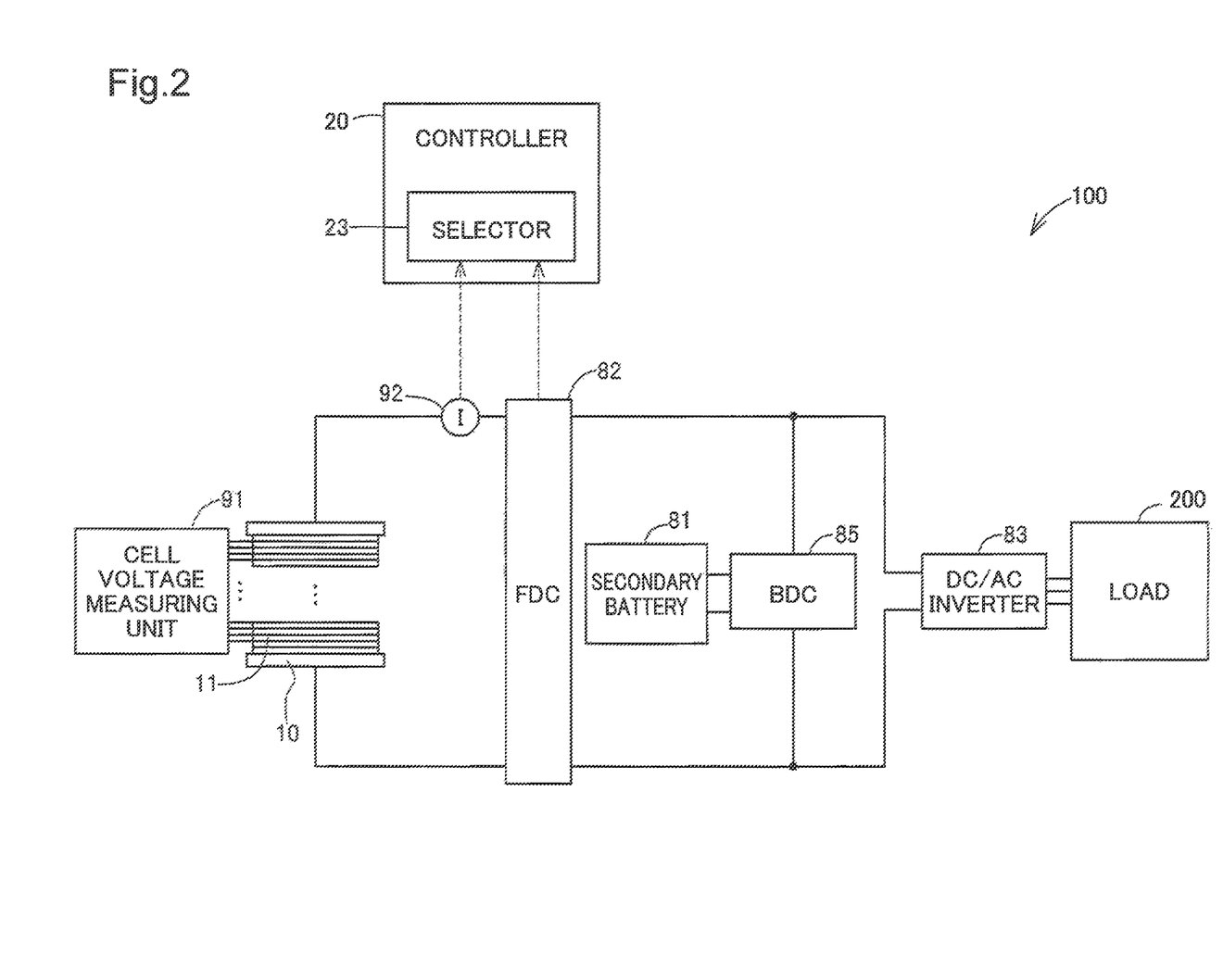
FIG. 2 is a schematic diagram showing the electrical configuration of the fuel cell system

FIG. 2 is a schematic diagram showing the electrical configuration of the fuel cell system 100. In addition to the previously described controller 20 and the like, the fuel cell system 100 is also equipped with a secondary battery 81, an FDC 82, a DC/AC inverter 83, a BDC 85, a cell voltage measuring unit 91, and a current measuring unit 92.

The cell voltage measuring unit 19 is connected to each cell 11 of the fuel cell 10, and measures the voltage of each cell 11 (cell voltage). The cell voltage measuring unit 91 sends the measurement results to the controller 20. The current measuring unit 92 measures the value of the power generation current by the fuel cell 10 (hereafter called "measured current value"), and sends that to the controller 20. The measured current value sent to the controller 20 is input to the selector 23.

The FDC 82 and the BDC 85 are circuits constituted as DC/DC converters. The FDC 82 controls the power generation current and power generation voltage by the fuel cell 10 based on control of the controller 20, and also transforms the power generation voltage and supplies it to the DC/AC inverter 83. Furthermore, the FDC 82 measures the power generation voltage value (hereafter called "measured voltage value") and sends it to the controller 20. The measured voltage value sent to the controller 20 is input to the selector 23. The BDC 85 controls the charge and discharge of the secondary battery 81 based on the control of the controller 20. The secondary battery 81 is constituted by a lithium ion battery, and functions as an auxiliary power source of the fuel cell 10.

The DC/AC inverter 83 is connected to the fuel cell 10 and the load 200. The DC/AC inverter 83 converts direct current power obtained from the fuel cell 10 and the secondary battery 81 to alternating current power, and supplies it to the load 200. The regenerative power generated with the load 200 is converted to DC current by the DC/AC inverter 83, and is charged to the secondary battery 81 by the BDC 85.

The FDC 85 applies alternating current signals of a low frequency (e.g. 20 Hz) to the fuel cell 10 in accordance with commands from the controller 20. The FDC 85 superimposes this alternating current signal on the power generation current from the fuel cell 10 and applies it. Thus, the measured current value by the current measuring unit 92 and the measured voltage value by the FDC 85 are values for which this alternating current signal is superimposed.

The applying of the alternating current noted above is executed to determine whether the electrolyte membrane contained in the fuel cell 10 is dry or wet. When the alternating current signal is applied to the fuel cell 10, it may be to measure the impedance of the fuel cell 10. The impedance of the fuel cell 10 is known to reflect the moisture volume within the fuel cell 10, and may be used for the determination noted above.

Figure 3:
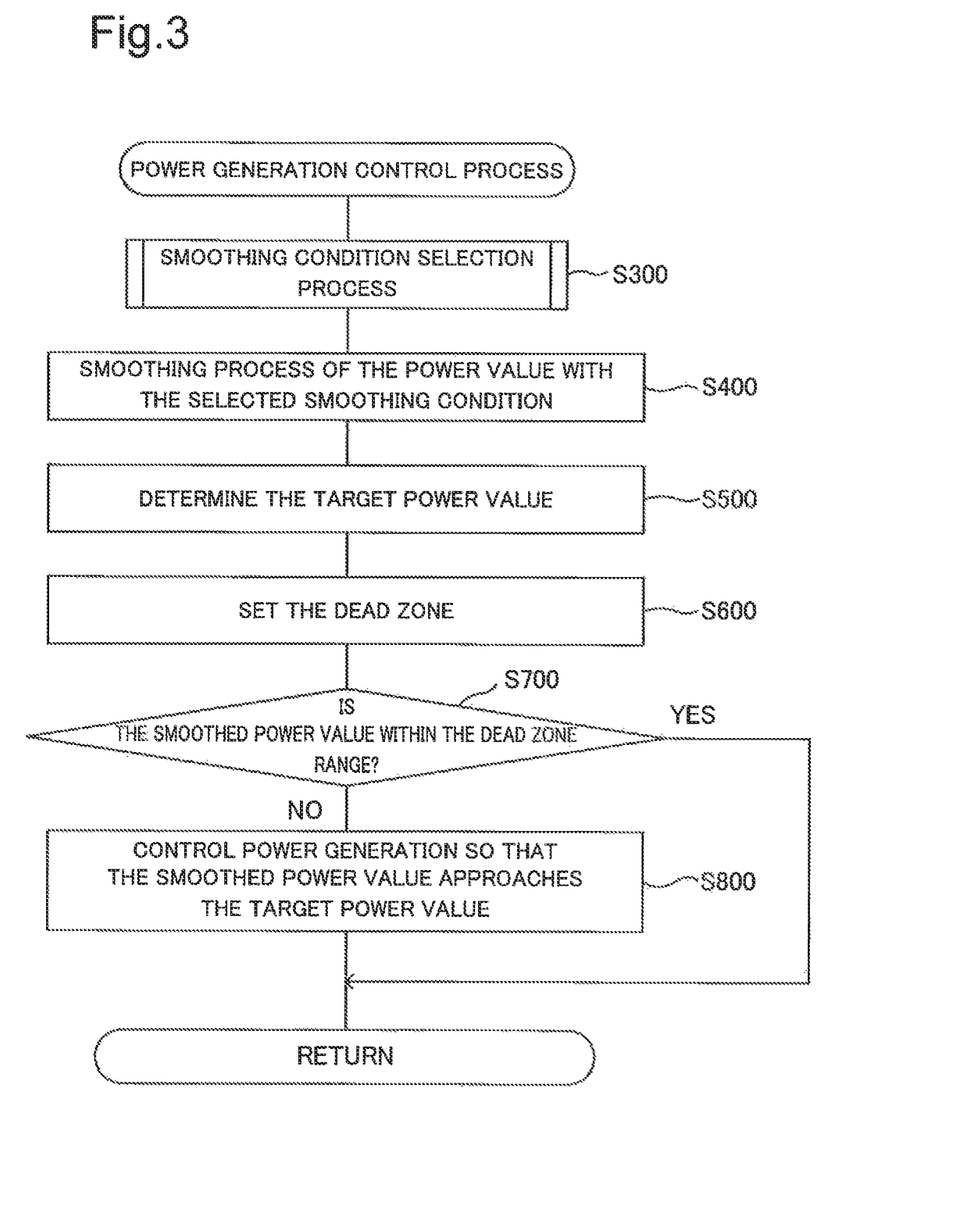
FIG. 3 is a flow chart showing the power generation control process.

FIG. 3 is a flow chart showing the power generation control process. The power generation control process is executed repeatedly by the controller 20 during power generation by the fuel cell 10. By executing the power generation control process, the controller 20 function as the power generation control device that realizes the power generation control method.

Figure 4:
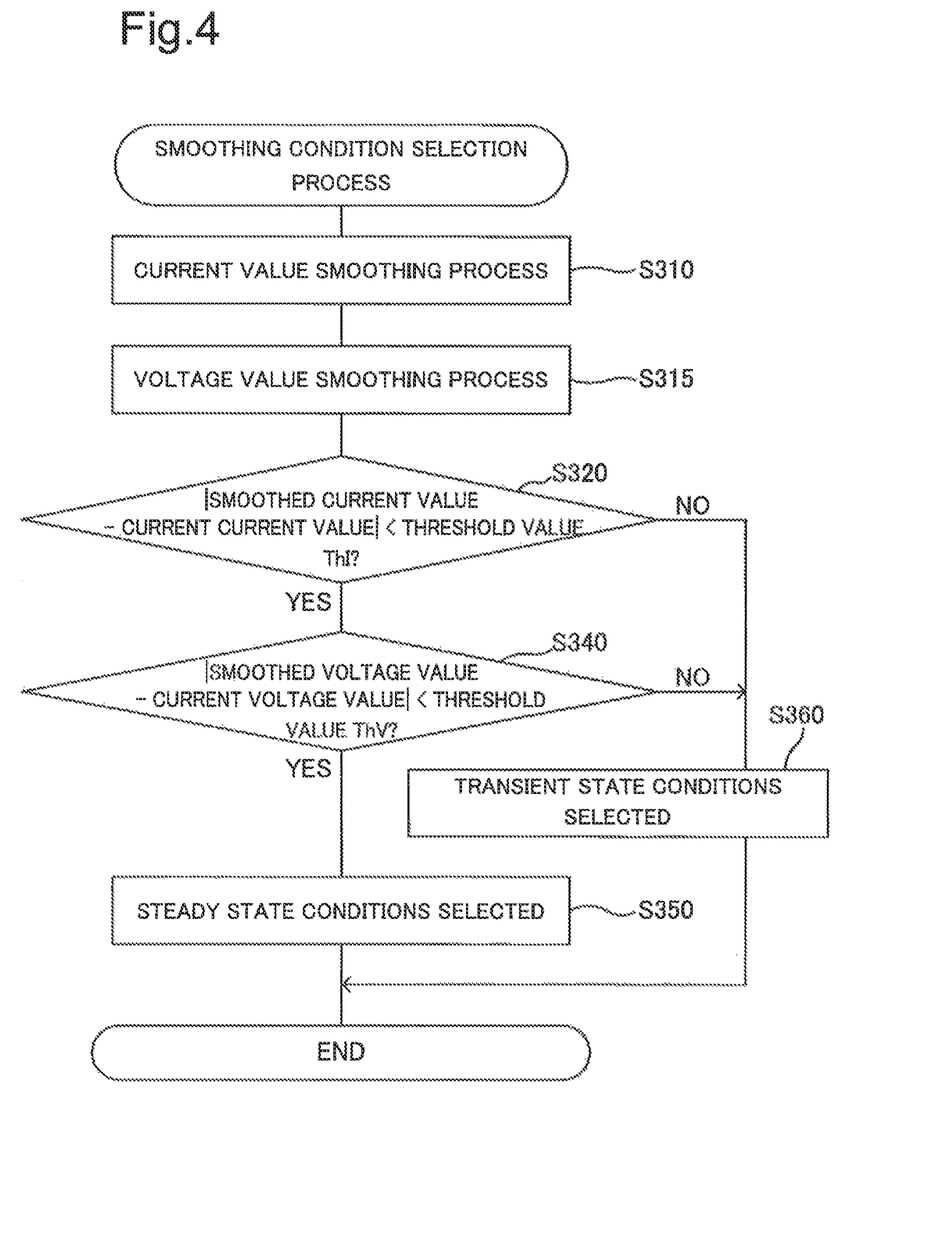
FIG. 4 is a flow chart showing the smoothing condition selection process.

First, the smoothing condition selection process is executed (step S300). FIG. 4 is a flow chart showing the smoothing condition selection process. Each step of the smoothing condition selection process is executed by the selector 23 of the controller 20. First, the smoothing process is executed with the measured current value as the subject (step S310). With this embodiment, a filter process (annealing process) using movement averaging is used as the specific method of the smoothing process. The conditions used for the filter process with the measured current value as the subject are set in advance. These conditions are time series segments and weighting for each time. This time series segment is the length of time indicating to what degree from the present time going backward the calculation results are reflected. Weighting is set so as to be heavier the closer the value is to the present time.

Next, the smoothing process is executed with the measured voltage value as the subject (step S315). Step S315 is similar to the smoothing process with step S310. The conditions used for this filter process may be the same or may be different from step S310.

Subsequently, a determination is made of whether the absolute value of the difference between the current value calculated by the smoothing process noted above (smoothed current value) and the present measured current value (present current value) is less than a threshold value ThI (step S320). The step S320 is a step of determining whether the current is in the transient state or the steady state, and the threshold value ThI noted above is set in advance as the value suited for this judgment.

When the absolute value of the difference between the smoothed current value and the present current value is less than the threshold value ThI (step S320, Yes), a determination is made of whether the voltage value calculated with the smoothing process noted above (smoothed voltage value) and the present measured voltage value (present voltage value) is less than a threshold value ThV (step S340). Step S340 is similar to step S320.

When the absolute value of the difference between the smoothed voltage value and the present voltage value is less than the threshold value ThV (step S340, Yes), steady state conditions are selected (step S350), and the smoothing condition selection process is ended. Steady state conditions are the conditions selected when the current value and the voltage value are both in a steady state, in other words, when the power generating state is in a steady state, and are used for the smoothing process with the measured power value as the subject (described later using FIG. 3).

Meanwhile, when the absolute value of the difference between the smoothed current value and the present current value is the threshold value ThI or greater (step S320, No), or when the absolute value of the difference between the smoothed voltage value and the present voltage value are the threshold value ThV or greater (step S340, No), transient state conditions are selected (step S360), and the smoothing condition selection process is ended. Transient state conditions are the conditions selected when at least one of the current value or the voltage value is in a transient state, in other words, when the power generating state is in a transient state, and is used for the smoothing process with the measured power value as the subject (described later using FIG. 3).

Compared to the transient state conditions, the steady state conditions are conditions set so that the values are smoother. In other words, compared to the transient state conditions, the steady state conditions are set to have longer time series segments, and to have a gradual decrease in weighting toward the past from the present time. For example, the smoothed power value Ps may be calculated as $Ps=\alpha1\times Pr1+\alpha2\times Pr2$ with the transient state, and $Ps=\beta1\times Pr1+\beta2\times Pr2+\beta3\times Pr3$ with the steady state. Note that $\alpha1>\alpha2$, $\beta1>\beta2>\beta3$, $\alpha1+\alpha2=\beta1+\beta2+\beta3=1$. Pr1, Pr2, and Pr3 are measured power values at each time, and Pr1 is when the measurement time is closest to the present time, Pr2 is the next closest, and Pr3 is the next closest. Also, for example, as with $\alpha1>\beta1$, compared to the steady state, the transient state is weighted to a value closer to the present time.

When the smoothing condition selection process ends, as shown in FIG. 3, the controller 20 executes the smoothing process with the measured power value as the subject (step S400). The measured power value is calculated using the product of the measured voltage value and the measured current value. For this smoothing process, the conditions selected with the smoothing condition selection process are used.

Next, the controller 20 sets a target power value Ptgt (step S500). The target power value Ptgt is set based on the requested power value from the load 200. However, the target power value Ptgt is set with the condition that it is an upper limit power value Pmax or less. In other words, even when the target power value Ptgt that may satisfy the requested power value exceeds the upper limit power value Pmax, the target power value Ptgt is set to the upper limit power value Pmax or less. The upper limit power value Pmax is a variable set based on the power generating state of the fuel cell 10, and for example adds the fuel cell 10 generated electric power, the power generating voltage, the power generation current, the temperature or the like, and is set to protect the fuel cell 10, the secondary battery 81 or the like.

Next, the dead zone setter 26 sets the dead zone (step S600). We will describe the dead zone using FIG. 5.

Figure 5:
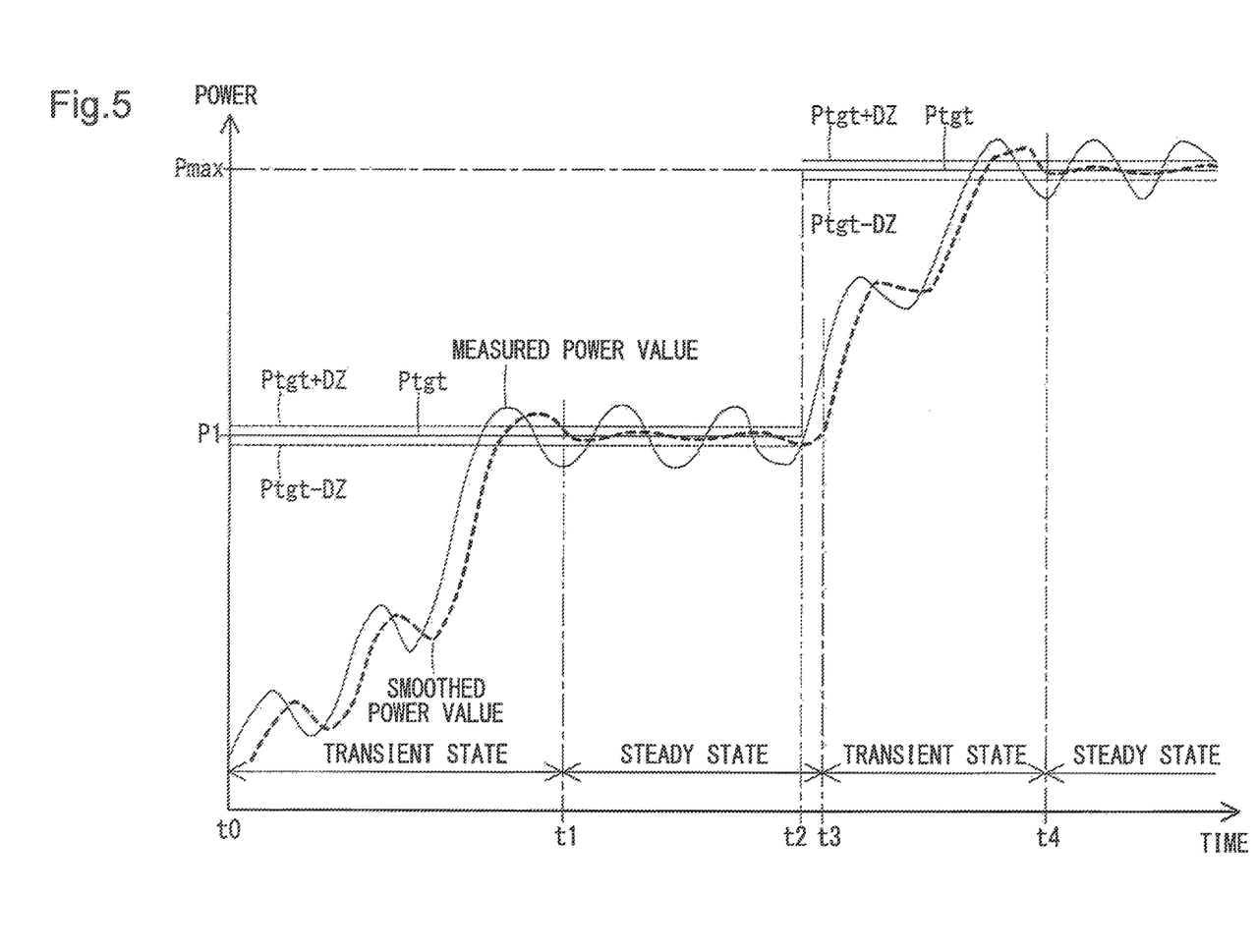
FIG. 5 is a graph showing an example of the effects of control by the power generation control process.

FIG. 5 is a graph showing an example of the control results by the power generation control process. The vertical axis of the graph shows power, and the horizontal axis shows time. For the target power value Ptgt, between time t0 to time t2 is set to power value P1, and from time t2 and thereafter is set to a value equal to upper limit power value Pmax. The dead zone is set as a range for which the target power value Ptgt for each time is a center value, and which is given the same section width DZ above and below (Ptgt±DZ).

With this embodiment, when Pmax−Ptgt<DZ is satisfied, the dead zone is set so as to include a range exceeding the upper limit power value Pmax. In the case shown in FIG. 5, from time t2 and thereafter, the target power value Ptgt matches the upper limit value Pmax (Pmax−Ptgt=0<DZ), so the dead zone includes a range exceeding the upper limit power value Pmax.

The transient state and the steady state shown in FIG. 5 are set with the smoothing condition selection process described previously. In the case shown in FIG. 5, from time t0 to time 1 and from time t3 to time t4 are the transient state, and from time t1 to time t3 and from time t4 and thereafter are the steady state.

Whether it is the transient state or the steady state is set based on the current value and the voltage value as described previously, so though there is a strong correlation with the fluctuation of the power value, this does not mean that it is set directly from the fluctuation of the power value.

Next, the stopper 27 determines whether the power value calculated by the smoothing process noted above (smoothed power value) is within the range of the dead zone (step S700).

When the smoothed power value is not within the range of the dead zone (step S700, No), the power generation controller 28 executes control for the smoothed power value to approach the target power value Ptgt (hereafter called "power control") (step S800), and ends the power generation control process. With the case shown in FIG. 5, for the time band of most of from time t0 to time t1 and most of from time t2 to time t4, the smoothed power value is outside the range of the dead zone.

Meanwhile when the smoothed power value is within the range of the dead zone ((step S700, Yes), the stopper 27 skips step S800, and ends the power generation control process. In other words, it does not execute power control.

In the case shown in FIG. 5, in the time band of from around time t1 until time t2 and from around time t4 and thereafter, the smoothed power value is within the dead zone range. The reason that the expression around time t1 and around time t4 is used in this way is because there is a time skew in relation to switching between the transient state and the steady state in terms of whether the smoothed power value is within the dead zone range. If the smoothed power value is within the dead zone range, then even if the smoothed power value does not match the target power value Ptgt and there is a deviation, power control is not executed. In other words, the current power generating state is maintained. For example, even if the smoothed power value exceeds the upper limit power value Pmax, if the smoothed power value is within the dead zone range, the control of reducing the smoothed power value is not executed.

Figure 6:
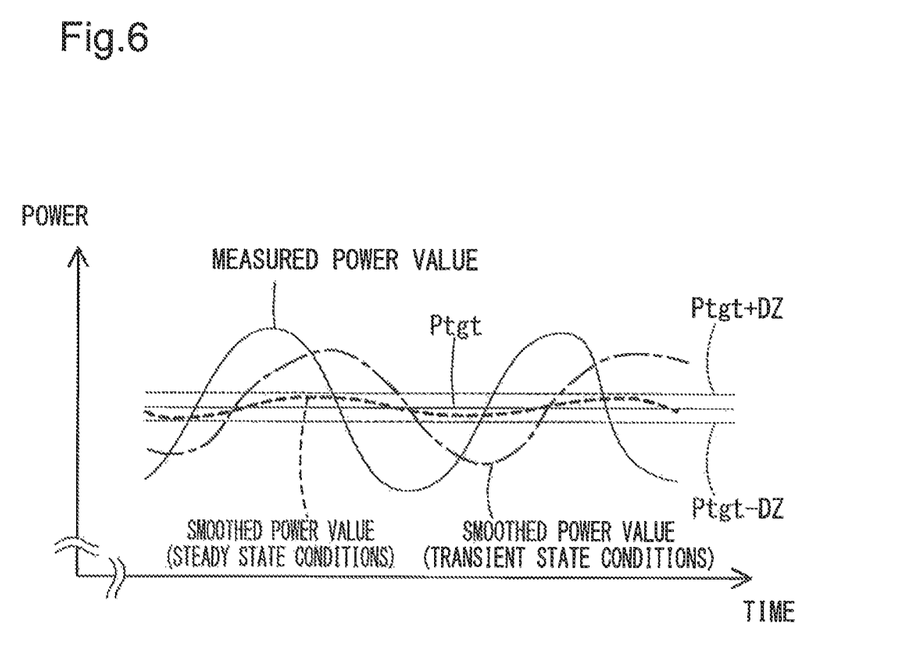
FIG. 6 is a graph for comparing steady state conditions and transient state conditions.

FIG. 6 is a graph that compares the steady state conditions and transient state conditions. FIG. 6 shows a case when the power generated by the fuel cell 10 is fixed. In other words, vibration of the measured voltage value shown in FIG. 6 is due to an alternating current signal.

In such a case, since the power generating state is in a steady state, the smoothing process is executed using steady state conditions. As shown in FIG. 6, the smoothed power value executed by the steady state conditions is stabilized in a state kept within the dead zone range. Said another way, the section width DZ is set to be the amplitude of the alternating current signal components smoothed using the steady state conditions or greater. Amplitude with this embodiment means the displacement volume from the center value.

Meanwhile, the smoothed power value by the transient state conditions shown in FIG. 6 show a value under the conditions of using the smoothing process using transient state conditions with the same measured current value as noted above as the subject, and of not executing power control even if the smoothed power value is out of the dead zone. This kind of condition is not used with this embodiment.

As shown in FIG. 6, the smoothed power value by the transient state conditions go out from the dead zone in a portion of the time zone. Furthermore, vibration of the alternating current signal itself goes out from the dead zone for a portion of the time band as shown in FIG. 6. Said another way, with the section width DZ, the amplitude of the alternating current signal itself is set to be even smaller than the alternating current signal component smoothed using the transient state conditions.

The reason that the section width DZ is set as noted above is to establish both stopping of power control to the extent possible in the steady state, and to have good responsiveness of control to the extent possible in the transient state. If the section width DZ is too large, detection of fluctuation in the generated electric power is delayed, and the volume of overshoot and undershoot is increased, so the control responsiveness worsens. Thus, it is preferable to set the section width DZ to be as narrow as possible to make the control responsiveness better. Thus, both the items noted above are established if the section width DZ is set to be as narrow as possible in the range for which the objective set for the dead zone is achieved. The objective for which the dead zone, as described previously, is to avoid the control of the smoothed power value becoming unstable due to the effect of the alternating current signal despite the generated electric power value being stable. However, as shown in FIG. 6, the section width DZ with this embodiment emphasizes the stability of the smoothed power value in the steady state, and is set as a width with a slight margin in relation to the amplitude of the smoothed power value.

Furthermore, it may be to set the section width DZ to be narrow by changing the conditions of the smoothing process in the transient state and the steady state, and both items noted above are realized with good conditions.

The present invention is not limited to the embodiments, working examples, or modification examples of this specification, and may be realized with various constitutions within a scope that does not stray from its gist. For example, it may be to replace or combine as appropriate the technical features in the embodiments, working examples, and modification examples corresponding to the technical features in each mode noted in the summary of the invention section in order to address part or all of the problems described previously, or to achieve a part or all of the effects described previously. If that technical feature is not described as being essential in this specification, it may be eliminated as appropriate. Following are examples.

Various modifications may be considered for setting of the dead zone. For example, the top side section width and the bottom side section width may be different widths. For example, when the target power value is set near the upper power value, based on the technical concept of being able to allow the measured power value to lean at the lower side more than to lean at the top side, the lower side section width may be larger than the top side section width.

It may be to set the dead zone using a larger width than this embodiment so as to not have the smoothed power value go out from the dead zone even if the smoothed power value fluctuates within the steady state range.

The section width of the dead zone may be the same as the amplitude of the smoothed power value in the steady state, or may be smaller than this amplitude. For example, even if the section width of the dead zone is smaller than the amplitude noted above, if the difference is slight, the time for which the smoothed power value goes out from the dead zone is slight, so it is thought that control will be stable.

Various methods may be considered for the smoothing process. For example, it may be a simple weighted moving average or index moving average. Alternatively, it may be to simply find the average value of the measured values with time series segments.

It may be to use an analog circuit with the smoothing process. For example, it may be to realize this by detecting the current value as an analog signal and passing it through an integrated circuit. The smoothing degree may be adjusted with a time constant of the integrated circuit.

For the smoothing process conditions, the same items may be used for the steady state and the transient state. In this case, determining whether it is the steady state or the transient state is unnecessary, so the processing load is reduced.

It may be to not execute the smoothing process. In this case, the processing load is further reduced. Even if the smoothing process is not executed, if the section width of the dead zone is set to match the amplitude by the alternating current signal, it may be to stabilize control in the steady state.

The upper limit value of the dead zone may also be set so as to exceed the upper limit value of the target power value. In this case, it may be to inhibit the smoothed power value from exceeding the target power value.

It may be to change the method of determining whether it is the steady state or the transient state. For example, it may be to determine this based on at least one of the current value, the voltage value, and the power value.

The physical quantity that is subject to control may be other than the power, for example it may be voltage or current. In other words, it may be to control the smoothed voltage value or the smoothed current value to be near the target value.

The subject fuel cell does not have to be for an automobile, but may also be an item mounted in other transport equipment (two wheeled vehicle, train car or the like), or a stationary item.

At least a portion of the functions and processes realized using software with the embodiments noted above may also be realized using hardware. Also, at least a portion of the functions and processes realized using hardware may be realized using software. As hardware, for example, it may be to use various types of circuits (circuitry), such as integrated circuits, discrete circuits, or circuit modules combining those circuits, for example.

What is claimed is:

1. A fuel cell system comprising:
    a power generation controller that controls a power value subject to control, which is a value exhibiting a power generating state by a fuel cell and is a value that is affected by alternating current applied to the fuel cell, to approach a target value;
    a target power band setter that sets a target power band, wherein the target power band is defined by an upper limit and a lower limit between which the target value is contained as a reference;
    a stopper configured to stop control of the power value by the power generation controller when the power value is within the target power band; and a circuit that executes applying of the alternating current and measurement of a voltage for which the alternating current was superimposed on a power generation voltage of the fuel cell,
    wherein when the power value is not within the target power band, the stopper is configured to control supply of air to the fuel cell so that the power value approaches the target value.

2. The fuel cell system according to claim 1, wherein the power generation controller acquires a value for which a smoothing process was done in time series on a physical quantity indicating the power generating state as the power value subject to control.

3. The fuel cell system according to claim 2, further comprising:
    a selector that selects as processing conditions used for the smoothing process steady state conditions when the power generating state is a steady state, and selects transient state conditions when the power generating state is a transient state.

4. The fuel cell system according to claim 3, wherein the target power band setter is configured to set the upper limit or the lower limit equal to a limit value, wherein a difference between the target value and the limit value is equal to or greater than an amplitude of a smoothed alternating current signal obtained by executing the smoothing process on the alternating current using the steady state conditions.

5. The fuel cell system according to claim 3, wherein the value exhibiting the power generating state is more smoothed when the steady state conditions are selected than when the transient state conditions are selected.

6. The fuel cell system according to claim 3, wherein the target power band setter is configured to set the upper limit or the lower limit equal to a limit value, wherein a difference between the target value and the limit value is smaller than an amplitude of a smoothed alternating current signal obtained by executing the smoothing process on the alternating current using the transient state conditions.

7. The fuel cell system according to claim 3, wherein the selector determines whether the power generating state is the transient state or the steady state based on at least one of current value fluctuation and voltage value fluctuation.

8. The fuel cell system according claim 2, wherein the power generation controller acquires the physical quantity based on the voltage measured by the circuit.

9. The fuel cell system according to claim 1, wherein the circuit is a converter that transforms the power generation voltage.

10. The fuel cell system according to claim 2, wherein the physical quantity is electrical power.

11. The fuel cell system according to claim 1, wherein when a difference between the upper limit of the target power band and the target value is smaller than a difference between the target value and an upper limit value of the target value, the target power band setter sets the upper limit of the target power band to a value greater than the upper limit value of the target value.

12. A fuel cell control method comprising:
controlling a power value subject to control, which is a value exhibiting a power generating state by a fuel cell and is a value that is affected by alternating current applied to the fuel cell, to approach a target value;
setting a target power band, wherein the target power band is defined by an upper limit and a lower limit between which the target value is contained as a reference;
stopping the controlling of the power value when the power value is within the target power band; executing, via a circuit, applying of the alternating current and measurement of a voltage for which the alternating current was superimposed on a power generation voltage of the fuel cell; and
when the power value is not within the target power band, controlling supply of air to the fuel coil so that the power value approaches the target value.

13. The control method according to claim 12, further comprising:
acquiring a value for which a smoothing process was done in time series on a physical quantity indicating the power generating state as the value subject to control.

14. The control method according to claim 13, further comprising:
selecting as processing conditions used for the smoothing process steady state conditions when the power generating state is a steady state, and selecting transient state conditions when the power generating state is a transient state.

15. The control method according to claim 14, wherein setting the target power band includes setting the upper limit or the lower limit equal to a limit value, wherein a difference between the target value and the limit value is equal to or greater than an amplitude of a smoothed alternating current signal obtained by executing the smoothing process on the alternating current using the steady state conditions.

16. The control method according to claim 14, wherein the value exhibiting the power generating state is more smoothed when the steady state conditions are selected than when the transient state conditions are selected.

17. The control method according to claim 14, wherein setting the target power band includes setting the upper limit or the lower limit equal to a limit value, wherein a difference between the target value and the limit value is smaller than an amplitude of a smoothed alternating current signal obtained by executing the smoothing process on the alternating current using the transient state conditions.

18. The control method according to claim 14, further comprising determining whether the power generating state is the transient state or the steady state based on at least one of current value fluctuation or voltage value fluctuation.

19. The control method according to claim 13, further comprising acquiring the physical quantity based on voltage measured by the circuit.

20. The control method according to claim 12, wherein the circuit is a converter that transforms the power generation voltage.

* * * * *